United States Patent Office 2,697,383
Patented Dec. 21, 1954

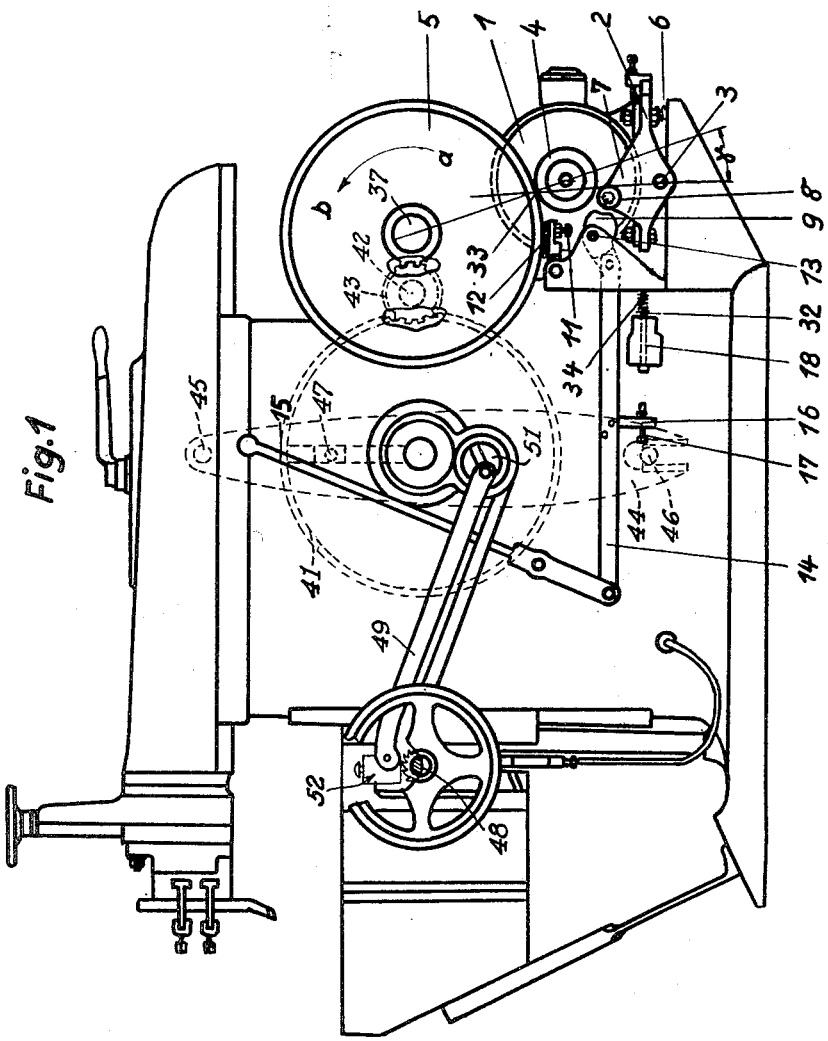

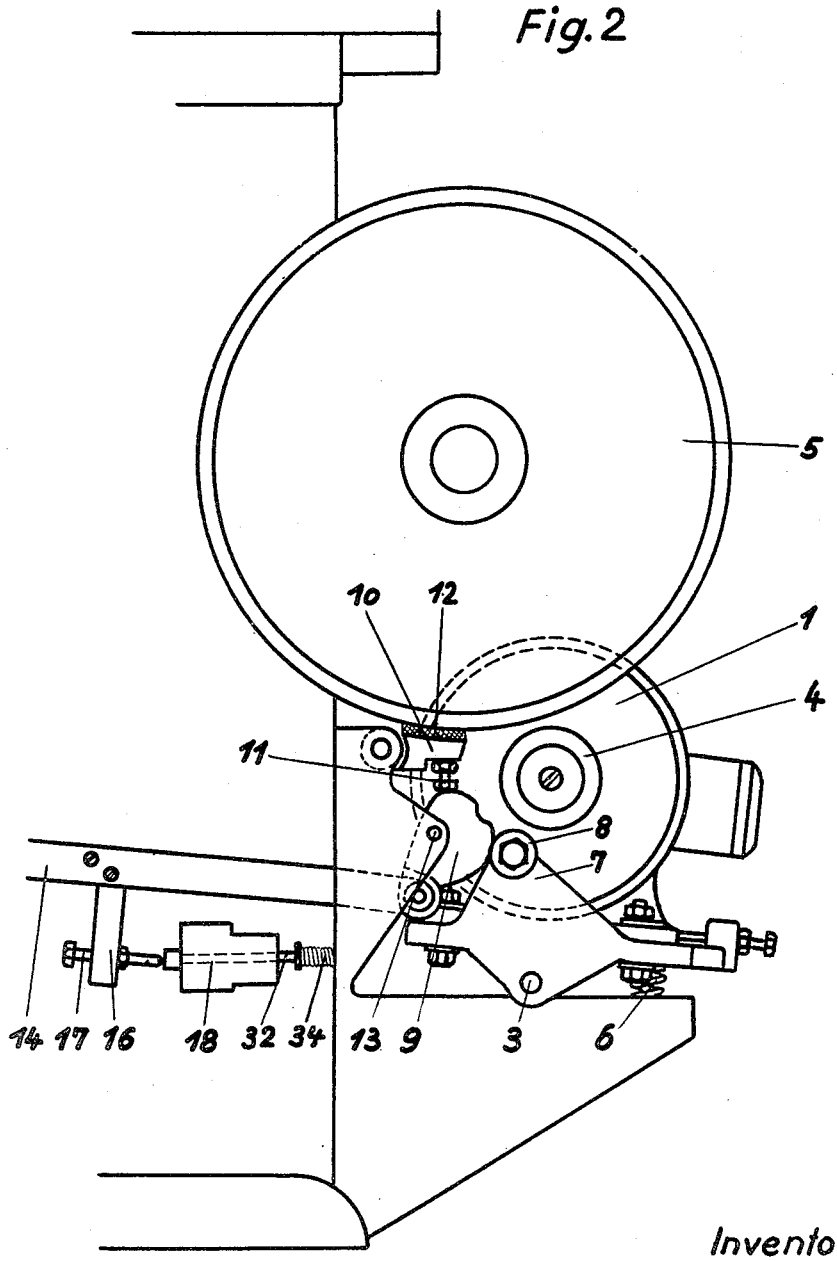

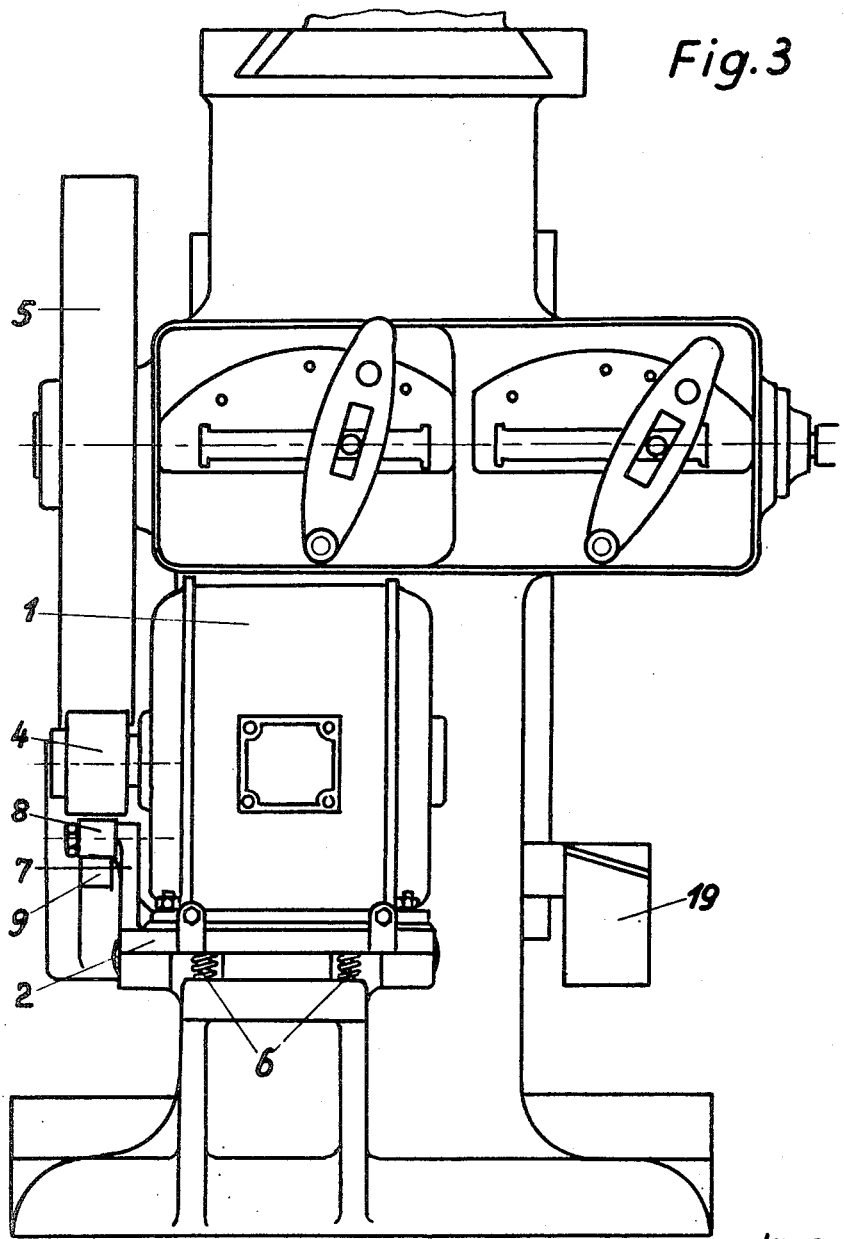

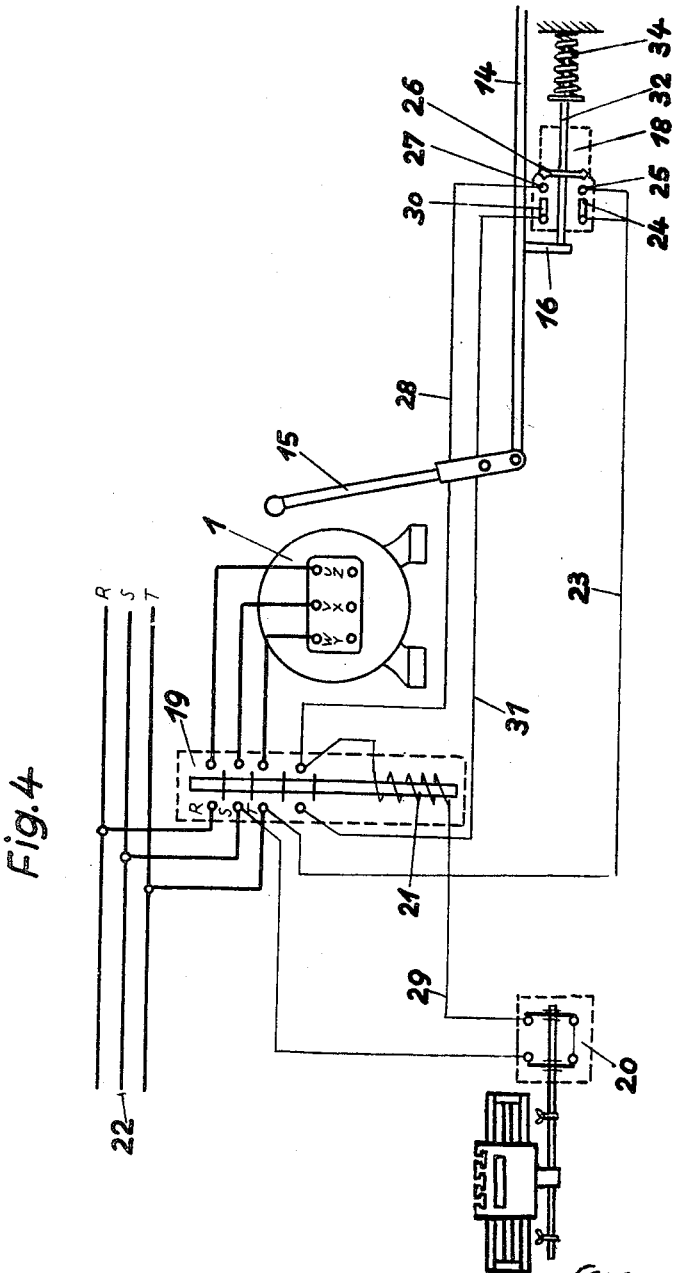

2,697,383

HIGH SPEED SHAPING-MACHINE WITH A FRICTION DRIVE

Friedrich Klopp, Solingen-Wald, Germany

Application March 31, 1950, Serial No. 153,073

Claims priority, application Germany October 27, 1949

10 Claims. (Cl. 90—40)

This invention relates to high speed planers having an individual electric motor drive and mechanical power transmission to the ram.

Many examples of such high speed planers are known for mechanical operations on all types of metal, particularly steel and iron. It is desirable in such high speed planers to connect a retarding member between the electric driving motor and the ram such that the ram is properly controlled on the impact of the tool on the workpiece at the beginning of the working stroke. For this purpose it is usual in such planers to provide a belt drive between the mechanical driving arrangements for the ram and the electric motor which arrangements serve at the same time to control the speed of the electric motor.

According to the invention a friction wheel drive having a movably mounted driving wheel is installed between the driving motor and the ram, the driving wheel being brought into and out of engagement with the driven wheel by means of a lever henceforth referred to as a control lever by which a brake is also operated through which the part of the machine connected with the driven wheel of the friction wheel drive may be braked in dependence upon the disengagement of the driving wheel. The possibility thus provided of using a friction wheel drive in shaping machines brings with it many advantages. The local regulation is substantially less important than when using a belt drive which is obtained from the particularly favourable advantage that the shaft of the driving wheel can be advanced towards that of the driven wheel. The retarding operation is excellent. Further the longer life of the friction wheel drive is obtained. Often it is advantageous to make the driving wheel in known manner of cellulose material and to allow this wheel to co-operate with a driven wheel made of iron. After the lapse of a considerable time, the cellulose friction wheel generally has to be changed. The changing operation is in addition effected much more easily and quickly than with a belt. The control lever by means of which the engagement between the driving wheel and the driven wheel is controlled, simultaneously operates a brake for stopping the driven parts of the machine which is of considerable importance as regards the operator of a high speed planer. First in this manner the friction wheel drive can be used for the high speed planer where it is easily accessible while the drive for operating the ram is fixed in a suitable position.

Preferably the driving wheel of the friction wheel drive is secured to the armature shaft of the movably mounted electric motor. In this manner a particularly simple, cheap and elegant construction of the invention is obtained. It is necessary to urge the driving wheel of the driving mechanism against the driven wheel by means of spring power and/or weight loading.

In a preferred form of the invention the driving wheel of the friction wheel drive together with the driving motor is secured to a bracket which is rotatably mounted in such a manner that a spring device urges the driving wheel against the driven wheel while the control lever enables the bracket to be rotated against the resistance of the spring to interrupt the driving connection and, in the same direction of movement, enables the brake to be applied. In the case where the line connecting the point of contact of the driving wheel with the driven wheel and the point of rotation of the bracket and the radius which extends from the centre of the driven wheel through said point of contact and the centre of the driving wheel enclose an angle which is equal to or greater than the angle of friction between the driving and driven wheels; there follows automatically a pressure between the driving and driven wheels which is proportional to the load existing at that moment.

According to the invention the control lever operates on the bracket and also on the brake by means of a rotatably mounted cam or eccentric.

Usually every brake consists of two parts of which one is to be braked and the other effects the braking and consequently said one part is made movable for the purpose of braking. It is desirable that the said part of the brake device, which is rotatable for operation and in the following is referred to as a brake operating member, acts on the driven wheel of the friction wheel drive.

In this manner a particularly simple construction is available for the common control lever. Normally the rotatably mounted brake operating member is operated upon by its own weight. The common control lever solely by means of its cam moves the brake operating member against its own weight so that it presses against the driven wheel of the friction wheel drive.

According to the invention the motor drive is likewise interrupted in dependence upon the interruption of the drive between it and the high speed planer. The electric motor is thus stopped by an interruption in the friction wheel drive. This gives rise to valuable saving in current since very often the interruption of the operation of the ram lasts for longer than was at first intended. This object is attained by the invention in a very convenient manner since only the driving wheel is connected to the motor on the interruption of the friction wheel drive, the driving wheel moreover preferably being itself fixed to the armature shaft. Thus in addition the masses to be accelerated and decelerated by the motor are less.

According to the invention the control lever is also used for connecting and disconnecting the electric motor whereby supervision of the machine is considerably simplified.

Preferably the electric motor is connected up before the engagement of the driven wheel. Similarly it is disconnected after the disengagement of the friction wheel drive. It thus follows that on starting up, the motor is first accelerated to a steady speed before it takes up the torque. It is desirable so to arrange the switching that the motor has already reached its full speed before the friction wheel drive is engaged. The object is attained in a particularly simple manner by means of the control lever in that the switch for the electric motor is closed by spring power and is opened by means of the control lever.

According to the invention in addition the connection and disconnection of the electric motor is effected by a protective switch which can close and open a switch, hereinafter referred to as a machine switch, operated by the control lever and which enables a switch, hereinafter referred to as a movement limiting switch and operated in dependence upon the feed, to be closed. In general in high speed planers, the feed is effected by movement of the table on which the work is secured. It is however also possible to allow the feed to take place by means of a traversing movement of the ram itself transversely of its main operating direction. The use of this feature means that after the disconnection of the electric motor by the movement limiting switch the motor cannot be again connected up when the table is moved back by hand which is often preferable for examination of the work. Above all the operator is hence protected against accidents. A further advantage of such an arrangement consists in that at no time is the motor started under load thereby increasing its life.

For carrying out this feature, the machine switch which is the switch by which the motor is started by hand, preferably has two contact pairs which are temporarily bridged one after the other under the control of the control lever whereby the electric supply is connected to both contact pairs while the leads from the contact pair first bridged by the movement of the control lever connect up the circuit, which includes the movement limiting switch, for an electromagnet provided for operating the protective switch and the leads from the other contact pair complete the connection with this circuit in dependence upon the operated protective switch.

The accompanying drawings show one embodiment of the invention. In the drawings:

Fig. 1 shows a view of the operating side of a high speed planer constructed according to the invention in which the machine is connected up and the friction wheel drive is engaged.

Fig. 2 shows a part view of the high speed planer shown in Fig. 1 with the machine disconnected and the friction wheel drive disengaged, Fig. 3 shows a view of the high speed planer of Fig. 1 from the motor side and Fig. 4 shows the electrical circuit of the high speed planer of Figs. 1 to 3.

The improved driving means of this invention is adapted to be used with any of the conventional types of planers, and for purposes of illustration a planer of the rocker arm type is shown. The oscillating means for the ram 36 of such a planer is well known and need not be described in detail. This oscillating means comprises in general a drive shaft 37 having one or more gear clusters (not shown) driven thereby, these gear clusters being shiftable by control levers 38 and 39 into a variety of positions to control the speed of oscillation. Shaft 37 drives a large crank gear 41 through the intermediate shaft 42 which supports a plurality of gears 43 for selectively interconnecting the crank gear and drive shaft. This crank gear 41 oscillates a rocker arm 44 which is movably connected at its upper end 45 to ram 36 and is held for combined pivotal and sliding movement at its lower end by a stationary pin 46. The connection between crank gear 41 and rocker arm 44 comprises a crank pin 47 which is supported by the crank gear and is adjustable radially thereon. The transverse table feed screw shaft 48 is adapted to be rotated in synchronism with the ram by means of a link 49 which is eccentrically connected at one end to a rotatable member 51 turning with the crank gear, and connected at its other end to a pawl and ratchet mechanism 52 which intermittently rotates the feed screw shaft. As stated previously, these portions of the planer mechanism are well known in the art and in themselves do not form part of the invention.

The motor 1 is secured to a bracket 2 and carries on its armature shaft a friction wheel 4 made for example of cellulose material which as will be further described subsequently serves for driving a driven wheel 5 made of cast iron firmly secured to drive shaft 37. The bracket is mounted on a rotatable shaft 3. The connection of the point of intersection of this rotary axis in the plane of the drawing with the point of contact 33 between the friction wheel 4 and the driven wheel 5 (when the friction wheel drive is engaged) makes with the line extending through the rotary axis of the driven wheel 5, the point of contact 33 and the rotary axis of the friction wheel 4 an angle 8 which is equal to or greater than the angle of friction of the coefficient of friction between the friction wheel 4 and the driven wheel 5, the arrow $a-b$ showing the direction of rotation of the driven wheel 5. By means of such an arrangement it follows in known manner that the contact pressure varies automatically in proportion to the torque being transmitted at the moment.

A control lever 15 is rotatably mounted on the machine and acts through a draw rod 14 on a cam 9 which is rotatably mounted eccentrically as shown by means of a pin 13 on a bracket of the machine. On the same bracket is mounted, likewise rotatably, a brake shoe 10 which enables a brake block 12 to be effective on the outer circumference of the driven disc 5 during disengagement.

A machine switch 18 serves to connect up and disconnect the motor 1, the switch rod 32 of which switch is adapted to be operated by the draw rod 14 of the control lever 15 by means of a set screw 17 secured to a member 16 connected with the draw rod 14.

In the engaged position of the machine, as shown particularly in Fig. 1, the set screw is displaced from the electric switch rod 32 of the machine switch 18. The electric motor is connected up. Further the cam 9 is disengaged from the bracket 2 and the brake shoe 10. The friction wheel 4 is thus urged against the driven wheel 5 always according to the torque to be transmitted while the block 12 of the brake shoe 10 is out of contact with the driven disc 5.

To disengage the machine, the control lever 15 must be rotated in an anti-clockwise direction from the position shown in Fig. 1.

The cam 9 is thus rotated in an anticlockwise direction by means of the draw rod 14 whereby the cam comes into engagement with a roller 8 rotatably mounted within an angle 7 of the bracket. The bracket is thus rotated against the resistance of a pair of springs 6 in such a manner that the friction wheel 4 is moved out of contact with the driven wheel 5. Shortly after, the cam 9 through a set screw 11 provided on the brake shoe 10 operates on said brake shoe in such a manner that its block is urged against the outer circumference of the driven wheel 5 and thereby the driven parts of the friction wheel drive including the ram are braked. Simultaneously by means of the set screw provided on the draw rod 14, the switch rod 32 of the machine switch is so operated that the electric motor is disconnected.

The engagement of the machine occurs as the result of an inverse series of operations in which the control lever is rotated in a clockwise direction. First the motor is switched on and quickly reaches its full speed of rotation since it is running without a load. At the same time the brake is released and finally the friction wheel drive engages due to the release of the bracket 2.

For the electrical equipment of the machine, reference should be made particularly to Fig. 4 which shows the driving motor 1 which is illustrated as a three phase motor, the machine switch 18, the protective switch 19 and the double acting movement limiting switch 20. The switch rod 32 is controlled by a spring 34 which tends to urge the switch bridge 26 into its closed position. The protective switch 19 is closed in known manner by means of an electromagnet provided with a winding 21.

The current for energising the winding 21 flows from the network 22 over lead 23 to two contacts 24 and 25 of the machine switch 18. The contact 25 is associated with contact 27 while contact 24 forms a contact pair with contact 30. A lead 28 extends from contact 27 to one side of a phase of the protective switch, thence through a lead 29 in which the winding 21 of the electromagnet is connected to a double acting movement limiting switch 20 and thence to one conductor of the network.

A lead 31 extends from contact 30 to the other side of the same phase of the protective switch as that to which the lead 28 is connected.

In Fig. 4 the control lever 15 together with the draw rod 14 and the member 16 are shown in the disengaged position. For simplicity the set screw 17 has been omitted so that the member 16 acts directly on the switch rod 32. To start the machine, the control lever must be rotated in a clockwise direction from the position shown in Fig. 4. The switch rod 32 is thus released so that it can be moved towards the left by its spring 34. In this manner the bridge 26 very quickly moves to a position in which it connects together contact 25 and 27 whereby current flows through the winding 21 over leads 23 and 28. The protective switch is operated by the electromagnet.

On further movement of the control lever 15, the bridge 26 moves away from the contact pair 25, 27 and engages with the contact pair 24, 30. The winding 21 is now energised over leads 23, 31, one phase of the protective switch 19, the lead 29 and the closed movement limiting switch 20. The contact pair 24, 30 is sufficiently long so that the bridge 26 does not pass thereover on further movement of the control lever 15.

If now the circuit of the winding is interrupted at the switch 20 due to movement of the table, the protective switch releases and thereby disconnects the driving motor 1. Further operation of the motor by turning back the table by hand is therefore not possible.

If now the switch 20 is again closed in this manner, the circuit of the winding 21 remains interrupted since it extends over one phase of the unoperated protective switch as long as the bridge 26 engages with the contact pair 24, 30. Engagement has to be made again, between the two contacts 25 and 27 through the bridge 26 by a backward and return switching of the control lever 15, to connect up the arrangement again. In this manner the operator is protected against accidents due to unintentional starting up of the machine.

Having now particularly described and ascertained the nature of my said invention and in what manner the same is to be performed, I declare that what I claim is:

1. In a planer of the type having a ram, a continuously rotating drive shaft, a crank gear for transforming the continuous drive shaft rotation into reciprocating ram movement, a movable table and electric motor drive, friction wheel driving means between said drive shaft and motor including a driven wheel connected to the drive shaft and a driving wheel movable into and out of engagement with the driven wheel, control means for moving the driving wheel between its said positions, a protective switch movable between a position operating said motor and a position disconnecting the motor, a machine switch operated by said control means for moving said protective switch between its positions, and a movement limiting switch operated by said table for moving said protective switch to its disconnect position.

2. The combination according to claim 1, said machine switch being further provided with two contact pairs adapted to be sequentially bridged, an electromagnet for operating said protective switch, means for supplying power through one of said pairs of contacts to said electromagnet through said movement limiting switch, and means for supplying power through the other pair of contacts to said electromagnet when said protective switch is in motor-operating position.

3. In a planer of the type having a ram, a continuously rotatable drive shaft, a crank gear for transforming the continuous drive shaft rotation into reciprocating ram movement, and an individual motor drive, transmission means between said drive shaft and motor including a friction wheel drive having a driving wheel and a driven wheel, means supporting said driving wheel for movement between a position in engagement with said driven wheel and a disengaged position, a brake, means movably mounting said brake adjacent the driven side of said transmission means, and a single control means for moving said driving wheel to its disengaged position and simultaneously moving said brake into a position retarding the driven side of said transmission means.

4. The combination according to claim 3, further provided with resilient means urging said driving wheel into its engaged position.

5. The combination according to claim 3, said driving wheel supporting means comprising a pivotally mounted bracket supporting said motor and said driving wheel, and resilient means urging said bracket in such manner that said driving wheel engages said driven wheel.

6. The combination according to claim 3, said single control means comprising a cam engageable with both said driving wheel supporting means and said brake.

7. The combination according to claim 3, said driving wheel supporting means comprising a pivotally mounted bracket supporting said motor and said driving wheel, and resilient means urging said bracket in such manner that said driving wheel engages said driven wheel, said single control means comprising a cam engageable with both said bracket and said brake.

8. The combination according to claim 3, further provided with a control switch operative upon movement of said driving wheel to disengaged position to stop said electric motor.

9. The combination according to claim 8, further provided with means for moving said control switch into motor-operating position before the engagement of said driving means.

10. The combination according to claim 3, said driving wheel supporting means comprising a movably mounted bracket supporting said motor and said driving wheel, said single control means comprising a cam engageable with both said bracket and said brake, resilient means urging said bracket in such manner that said driving wheel engages said driven wheel, and a control switch for said motor operative upon disengaging movement of said driving wheel to stop the motor.

References Cited in the file of this patent

UNITED STATES PATENTS

| Number | Name | Date |
| --- | --- | --- |
| 106,642 | Williamson | Aug. 23, 1870 |
| 272,192 | Bean | Feb. 13, 1883 |
| 472,061 | Morton | Apr. 5, 1892 |
| 622,160 | Norton | Mar. 28, 1899 |
| 648,185 | Atkins et al. | Apr. 24, 1900 |
| 860,046 | Meston | July 16, 1907 |
| 910,901 | Bucherer | Jan. 26, 1909 |
| 1,267,158 | Zimmerman | May 21, 1918 |
| 1,801,939 | Sopkin et al. | Apr. 21, 1931 |

FOREIGN PATENTS

| Number | Country | Date |
| --- | --- | --- |
| 24,465 | Great Britain | Mar. 26, 1914 |